United States Patent [19]

Croce et al.

[11] Patent Number: 5,880,189
[45] Date of Patent: Mar. 9, 1999

[54] LIQUID PVC STABILIZERS AND LUBRICANTS

[75] Inventors: Michael A. Croce, Oakland; Kook Jin Bae, Kinnelon; Otto Loeffler, Colts Neck, all of N.J.

[73] Assignee: Witco Corporation, Greenwich, Conn.

[21] Appl. No.: 850,689

[22] Filed: May 2, 1997

Related U.S. Application Data

[60] Continuation of Ser. No. 483,684, Jun. 7, 1995, abandoned, which is a division of Ser. No. 338,028, Nov. 14, 1994, abandoned.

[51] Int. Cl.[6] ..................................................... C08K 5/51
[52] U.S. Cl. ........................... 524/15; 524/153; 524/397; 524/399; 524/400
[58] Field of Search ..................................... 524/397, 399, 524/400, 151, 153; 556/31, 132

[56] References Cited

U.S. PATENT DOCUMENTS

| | | | |
|---|---|---|---|
| 2,564,646 | 8/1951 | Leistner et al. | 524/147 |
| 2,716,092 | 8/1955 | Leistner et al. | 524/399 |
| 2,867,594 | 1/1959 | Hansen et al. | 524/151 |
| 2,997,454 | 8/1961 | Leistner et al. | 524/151 |
| 4,060,535 | 11/1977 | Cinco et al. | 556/132 |
| 4,102,839 | 7/1978 | Crochmore et al. | 524/400 |
| 4,348,308 | 9/1982 | Minagawa et al. | 524/141 |
| 4,401,779 | 8/1983 | Bae | 524/399 |
| 4,837,257 | 6/1989 | Aza et al. | 524/399 |
| 5,004,776 | 4/1991 | Tadenuma et al. | 524/399 |
| 5,102,933 | 4/1992 | Bae et al. | 524/397 |
| 5,147,917 | 9/1992 | Sugawara et al. | 524/357 |
| 5,283,273 | 2/1994 | Sander et al. | 524/399 |

OTHER PUBLICATIONS

R.E. Lally and F.R. Hansen—"Stabilization of Polyvinyl Chloride"—*Modern Plastics*, Dec. 1949 111, 112, 114, 156–162.

Deanin et al—"Synergism . . . Chloride"—*Polymer Engineering and Science*—Jun. 1973, vol. 13, No. 1, 35–39.

Robert A. Lindner "External Lubricants That Speed Fusion" *Plastics Compounding*—Sep./Oct. 1989.

*Primary Examiner*—Veronica P. Hoke
*Attorney, Agent, or Firm*—Scully, Scott, Murphy & Presser

[57] ABSTRACT

Disclosed is a stabilizer composition effective to protect PVC resin against heat-mediated deterioration, comprising a mixture of barium and zinc salts of aliphatic $C_6$–$C_{20}$ carboxylates and aromatic $C_7$–$C_{12}$ carboxylates, organic triphosphites of the formula $R_1OP(OR_3)OR_2$ wherein each of $R_1$, $R_2$ and $R_3$ is $C_6$–$C_{12}$ alkyl or phenyl, and organic acid phosphites of the formula $R_4OP(OH)OR_5$ wherein each of $R_4$ and $R_5$ is $C_6$–$C_{12}$ alkyl or phenyl, or $R_4$ can be hydrogen. PVC film compounded with this stabilizer composition also exhibits improved wettability and adherence to water-based inks applied to such films.

16 Claims, No Drawings

LIQUID PVC STABILIZERS AND LUBRICANTS

This is a continuation of application Ser. No. 08/338,028, filed on Nov. 14, 1994, abandoned, which is a continuation of application Ser. No. 08/483,684, filed Jun. 7, 1995, now abandoned.

BACKGROUND OF THE INVENTION

The present invention relates to printing onto PVC (i.e. polyvinyl chloride) materials, particularly flexible (i.e. plasticized) PVC film and sheeting.

Successful processing of PVC plastic film and sheeting using metal equipment such as extruders, roll mills, or calendars requires lubrication, i.e. the maintenance of a thin (ideally monomolecular) film of material between the metal and the plastic to reduce friction and prevent sticking of the plastic to the metal. Consequently, there is usually some lubricant-derived foreign material present on the surface of the PVC film or sheet as a separate phase into which minor components of the plastic (components and impurities in plasticizers, stabilizers, etc) may migrate. At the same time, successful printing requires first wetting of the plastic surface by the ink and then bonding of the ink's binder to the plastic to ensure that the print does not rub off or wash off. Any foreign material present on the surface of the PVC may constitute a barrier to the required wetting and bonding of the printing ink. Successful lubrication and printing therefore require careful balancing of conflicting influences.

A further complication is the likelihood of a time lag between the initial shaping of the plastic into e.g. film or sheet form, and printing, as quantities of unprinted PVC material may be shipped to off-site printing plants and warehoused for some time, possibly under warm and humid conditions, before being printed. In fact it has been observed that some PVC materials can be printed successfully when fresh but diminish in printability upon storage.

DISCUSSION OF THE PRIOR ART

Historically, problems with printing on PVC were dealt with beginning about 40 years ago with the commercialization of liquid stabilizers, particularly blends of barium alkylphenates with certain cadmium carboxylates and organic phosphites (see Leistner et al. U.S. Pat. No. 2,716,092) in hydrocarbon carriers such as mineral spirits. The recent recurrence of the problems referred to above coincides with the more or less simultaneous efforts to reformulate PVC stabilizers to exclude cadmium as well as hydrocarbons such as mineral spirits and to reformulate printing inks to water-based formulations minimizing the use of organic solvents.

Historically, the commodity lubricant for PVC processing in the U.S. has been stearic acid. Oxidized polyethylene, or ester or amide waxes, or some metal soaps, have been used also. "Handbook of Plastics Additives and Modifiers" (J. Edenbaum editor, 1992, Van Nostrand Reinhold) at pages 807–822 discloses illustrative PVC formulations including oxidized polyethylene.

Liquid stabilizers having a low volatility (i.e. high flash point) combining a high concentration of active ingredients with low viscosity, are disclosed in Bae, U.S. Pat. No. 4,401,779 and Aza et al., U.S. Pat. No. 4,837,257. Both relate to barium-cadmium salt combinations in which the barium component is a liquid barium alkylphenate-barium carbonate composition, and teach nothing about a barium-zinc composition in which the barium component by itself is a high melting solid and cadmium is absent or present only as a trace impurity.

Various stabilizers formulated without a cadmium component, without, however, any disclosure of low volatility (high flash point) and low viscosity liquid stabilizers, are disclosed in Minagawa et al., U.S. Pat. No. 4,348,308, Tadenuma et al., U.S. Pat. No. 5,004,776, Sugawara et al., U.S. Pat. No. 5,147,917, and Sander et al., U.S. Pat. No. 5,283,273.

BRIEF SUMMARY OF THE INVENTION

One aspect of the present invention is a liquid stabilizer composition which imparts heat stability to PVC and which is essentially free of cadmium, comprising
   (A) a salt mixture comprising cations of barium and zinc, one or more aliphatic carboxylates selected from the group consisting of straight and branched aliphatic saturated and unsaturated carboxylates containing 6 to 20 carbon atoms, and one or more aromatic carboxylates containing 8 to 10 carbon atoms, wherein the weight ratio of barium to zinc is about 2:1 to 6:1;
   (B) one or more organic triphosphites of the formula $R_1OP(OR_3)OR_2$ wherein $R_1$, $R_2$ and $R_3$ are the same or different and each is alkyl containing 6 to 12 carbon atoms, or phenyl; and
   (C) one or more organic acid phosphites of the formula $R_4OP(OH)OR_5$ wherein $R_4$ is alkyl containing. 6 to 12 carbon atoms, or phenyl, and $R_5$ is alkyl containing 6 to 12 carbon atoms, phenyl or hydrogen.

Another aspect of the present invention is a polyvinyl chloride resin composition having improved resistance to deterioration mediated by heat, comprising a polyvinyl chloride resin formed at least in part of the recurring group —CHCl—CX$_2$— and having a chlorine content in excess of 40%, where each X is either hydrogen or chlorine, and an amount of the foregoing liquid stabilizer effective to enhance the resistance of the resin to heat-mediated deterioration.

DETAILED DESCRIPTION OF THE INVENTION

One useful aspect of the stabilizers of the present invention is that they permit the operator to avoid having to use components based on metals which have become environmentally objectionable, such as arsenic, beryllium, cadmium, lead, mercury and thallium.

The stabilizers of the present invention are considered to be essentially free of cadmium, by which is meant that the total amount of cadmium is less than about 0.05 wt. % of the stabilizer, and less than 0.001 wt. % of PVC resin formulations. Preferably, the stabilizers of the present invention, and PVC formulations containing it, are essentially free of all six of the aforementioned metals, that is, the total amount of all six metals is less than about 0.05 wt. % of the stabilizer and less than about 0.001 wt. % of PVC formulations containing the stabilizer.

The stabilizer compositions of the present invention include a barium-zinc carboxylate component in combination with organic triphosphite and organic acid phosphite components. The are preferably used with an oxidized polyethylene component. It will be recognized that compositions effective as heat stabilizers comprise these components per se, and can comprise compositions containing these components in mixture with one or more additional components.

One component of the stabilizer composition is characterized herein as a salt mixture. That term is intended to comprise mixtures formed by physically combining separate components each previously formed separately. The term "salt mixture" is also intended to include mixtures formed in situ by mixing and/or reacting together precursors containing the desired cations and/or anions. The latter type of salt mixture is preferred in the present invention.

The salt mixture comprises cations of barium and zinc. The weight ratio of barium to zinc in the salt mixture should be in the range of about 2:1 to about 6:1, and is preferably about 3:1 to about 5:1 and more preferably about 4:1.

The salt mixture comprises as well an anionic component. This anionic component comprises two types of anions. The anionic component comprises one or more anions selected from the group consisting of straight and branched aliphatic, saturated and unsaturated carboxylates, containing 6 to 20 carbon atoms. The preferred carboxylates of this type are molecules containing 0 to 3 carbon—carbon double bonds. The most preferred carboxylates of this type are oleate and isomers of octanoate, such as 2-ethyl hexanoate.

The anionic component of the salt mixture also comprises one or more anions selected from the group consisting of aromatic carboxylates containing 8 to 10 carbon atoms. By "aromatic carboxylate" is meant molecules containing a phenyl ring to which the carboxylate moiety is bonded directly, or indirectly through a saturated or unsaturated alkylene bridge. The phenyl ring can be additionally substituted, and in the preferred embodiments herein is substituted with one or more alkyl groups. Preferred examples of aromatic carboxylates useful in the present invention include meta-toluate.

The weight ratio of the aliphatic carboxylate to the aromatic carboxylate will generally be in the range of about 1:3 to 3:1, and satisfactory results can be obtained wherein the weight ratio is about 1:1.

The salt mixture can be prepared by combining separate salts previously separately prepared, such as by physically intimately admixing salts such as barium toluate and zinc oleate, in the desired relative respective amounts thereof. It is believed that a more intimate mixture of the desired salts is obtained by reaction in situ of precursor compounds, and this technique of preparing the salt mixture is preferred. This latter technique also affords the operator greater flexibility in adjusting relative amounts of barium, zinc, and the several carboxylate components. For instance, basic compounds of zinc and barium (that is, compounds capable of reacting with the aliphatic and aromatic carboxylic acids to form the desired salts), such as zinc oxide, barium hydroxide, and the like, are added to an intimate mixture of e.g. oleic acid and meta-toluic acid under conditions of agitation and heat effective to provide a through mixture of the salts which form upon reaction of the barium and zinc compounds with the organic acids.

The stabilizers of the present invention also include an organic triphosphite component. The organic triphosphite is characterized by the formula $R_1OP(OR_3)OR_2$ wherein $R_1$, $R_2$ and $R_3$ are the same or different and each is an alkyl group containing 6 to 12 carbon atoms, or phenyl. The alkyl group can be straight or branched, and is preferably branched. Examples of alkyl groups useful in this component include the one or more branched isomers of decyl known collectively in the art as "isodecyl", and any of the isomers of branched octyl groups such as 2-ethylhexyl. Preferably, a mixture of organic phosphites corresponding to the above-mentioned formula is employed. An example of one such preferred mixture contains about 18–24 wt. % triphenyl phosphite, about 58–60 wt. % diphenylisodecyl phosphite, about 18–20% phenyldi-isodecyl phosphite, and about 1–2 wt. % of tri-isodecyl phosphite.

The stabilizer compositions of the present invention also include one or more organic acid phosphites of the formula $R_4OP(OH)OR_5$ wherein $R_4$ is a straight or branched alkyl group containing 6 to 12 carbon atoms, or phenyl; and $R_5$ is a straight or branched alkyl group containing 6 to 12 carbon atoms, phenyl, or hydrogen. The $R_4$ and $R_5$ groups can be straight or branched alkyl, and are preferably branched alkyl, or phenyl. As is the case with the organic phosphites, it has been found useful to employ a mixture of organic acid phosphites of the foregoing formula, such as 19–21 wt. % of diphenylacid phosphite, 58–60 wt. % of phenylisodecyl acid phosphite, and 18–22 wt. % of di-isodecyl acid phosphite.

The salt mixture of barium and zinc aliphatic and aromatic carboxylates should comprise about 30 wt. % to about 50 wt. % of the total amount present of said salt mixture, said one or more organic triphosphites, and said one or more organic acid phosphites. Preferably, the amount of the salt mixture expressed on this basis is about 35 to about 45 wt. %, and preferably about 40 wt. %.

The one or more organic triphosphites should be present in an amount of about 40 to about 60 wt. % of the total of the barium-zinc salt mixture, the one or more organic phosphates, and the one or more organic acid phosphites present. Preferably, the one or more organic triphosphites are present in amounts of about 45 wt. % to about 55 wt. % expressed on that basis, and more preferably about 50 wt. % to about 55 wt. %.

The one or more organic acid phosphites are present in amounts of about 4 to about 10 wt. % of the total amount of barium-zinc salt mixture, one or more organic triphosphites, and one or more organic acid phosphites present. Preferably, the one or more organic acid phosphites are present in amounts of about 4 wt. % to about 8 wt. %, and more preferably amounts of about 5 wt. % to about 7 wt. %, expressed on that basis.

To make the stabilizer, it is most convenient to combine the components which are liquid or easily liquifiable with no more than moderate heating, adding a modest amount of solvent or diluent if necessary to keep this mixture from becoming excessively viscous, and then to stir in the other components which are solid at ambient conditions. For instance, as will be disclosed more fully in the examples below, it is convenient to form the barium-zinc-carboxylate salt mixture, the organic triphosphite or mixture of organic triphosphites which are liquid at ambient conditions, and the organic acid phosphite or mixture of organic acid phosphites which are liquid at ambient conditions, to stir these components together, and then to add addition solid components as desired such as additional barium and/or zinc carboxylates, and/or additional organic triphosphites and/or additional organic acid phosphites. The additional components thus added can be overbased barium and/or zinc compounds, such as barium carbonate/barium carboxylate wherein the molar ratio of barium to carboxylate exceeds 1:1.

It is preferred to include in the stabilizer composition a diketone component which is one or more diketones of the formula $D_1C(O)$—$(CH_2)_i$—$C(O)D_2$ wherein i is 1 or 2, preferably 1, and each of $D_1$ and $D_2$ is phenyl or $C_{12}$–$C_{22}$ alkyl or alkylene, preferably phenyl. The preferred diketone is dibenzoyl methane. The diketone helps impart wettability (as defined herein) to the PVC resin and may assist in heat stabilization as well. The diketone, if used, will comprise about 1 wt. % to about 8 wt. % of the stabilizer composition, preferably about 5 wt. % thereof.

It has been further determined that including in the stabilized PVC an effective amount of oxidized polyethylene (also known as oxidized polymeric wax) further enhances the advantageous properties of the aforementioned stabilizer composition in providing notable heat stability, processing ease, and in affording improved wettability, that is, an improved ability (compared to PVC products not containing the oxidized polyethylene) to receive and retain printing from water-based inks. Oxidized polyethylene is a commercially available polymer additive, known by that term, and is believed to comprise polyethylene (preferably homopolymeric) which has been subjected to oxidation so as to form a small proportion of oxidic substitution, such as hydroxyl, ketonic or carboxylic) at various sites along the polymer chain. The oxidized polyethylene useful in the present invention should have a molecular weight of at least about 750. The acid number of the oxidized polyethylene is not critical, and can range from about 2 to about 50. The oxidized polyethylene should be a solid material at the temperatures of use of the PVC film or sheeting. It is preferred that the oxidized polyethylene have a melting point of at least about 60° C., up to about 150° C. A preferred oxidized polyethylene useful in the stabilizer compositions of the present invention is known as "AC Polyethylene 629A", an oxidized polymer having a molecular weight of about 2000, a softening point of about 213° of to about 221° F., and an acid number of 14 to 17 which is commercially available from Allied-Signal Corp.

It is preferred to incorporate the oxidized polyethylene into the aforementioned stabilized composition after addition of the stabilizer to the PVC resin. The weight ratio of oxidized polyethylene to the total amount of barium-zinc carboxylate salt mixture, organic triphosphite, and organic acid phosphite, should generally be in the range of about 1:2 to about 1:6, preferably about 1:3 to 1:5 and more preferably about 1:4.

The stabilized PVC composition comprising these ingredients can also contain conventional additional additives such as antioxidants, plasticizers, lubricity agents, flame retardants, fillers, pigments, and the like, in relative amounts affective to fulfill the desired functions of each such additional ingredient. These ingredients can be added, if desired, while the combination is being prepared of barium-zinc salt mixture, organic phosphite, and organic acid phosphite.

The stabilizer systems of the present invention are effective in enhancing the resistance to heat-mediated deterioration of PVC resin. That is, "heat-mediated deterioration" includes deterioration which is due to exposure to excessive heat, as well as deterioration which is initiated or accelerated by exposure to heat.

The terms "PVC" and "polyvinyl chloride" as used herein are inclusive of any polymer formed at least in part of the recurring group ($-CHCl-CX_2-$)$_n$ and having a chlorine content in excess of 40%. In this formula, each of the X groups can be either hydrogen or chlorine, and n is the number of units in the polymer chain. In PVC homopolymers, each of the X groups is hydrogen. Thus, the term includes not only polyvinyl chloride homopolymers but also after-chlorinated polyvinyl chlorides, as well as copolymers of vinyl chloride in a major proportion with other copolymerizable monomers in moderate proportion, such as copolymers of vinyl chloride and vinyl acetate, copolymers of vinyl chloride with maleic or fumaric acids or esters, and copolymers of vinyl chloride with styrene. The stabilizer compositions are effective also with mixtures of polyvinyl chloride in major proportion with a minor proportion of other synthetic resins such as chlorinated polyethylene or a copolymer of acrylonitrile, butadiene and styrene.

The stabilizer compositions of the present invention can be used with plasticized polyvinyl resin compositions of conventional formulation. Conventional plasticizers well known to those skilled in the art can be employed such as, for example, dioctyl phthalate, octyl diphenylphosphate, and epoxidized soybean oil. Particularly useful plasticizers are the epoxidized esters having from 20 to 150 carbon atoms.

The stabilizer compositions of the composition of the present invention are used in small but effective amounts to impart the desired stability to heat-mediated deterioration. Effective heat stability coupled with enhanced wettability by water-based ink formulations can be afforded generally by adding about 2 to about 5 phr (parts by weight per hundred parts by weight of resin) of the stabilizer composition of barium and zinc carboxylates, organic triphosphite(s) and organic acid phosphite(s) to the PVC resin to be compounded and formed into the desired film or sheeting. Preferred amounts of the stabilizer are in the range of about 3 to about 4 phr.

The oxidized polyethylene is believed to impart enhanced wettability, that is, an enhanced ability to allow a water-based ink applied to the surface to form a uniform, continuous or continuous-appearing film without the appearance of the formation of distinct micro beads or micro droplets of ink on the surface of the PVC film. The presence of the oxidized polyethylene with the stabilizer compositions of the present invention also imparts an enhanced ability for the water-based ink to adhere to the PVC film and to remain adherent thereto. By "water-based" ink formulations are included solutions, dispersions and emulsions wherein water is the continuous phase. Examples of such ink formulations abound in the printing field and are well known and ascertainable by those of ordinary skill in this art. Effective amounts of the oxidized polyethylene component are generally in the range of about 0.2 to 2 phr, and more preferably about 0.5 to 1.25 phr. The oxidized polyethylene is also believed to contribute lubrication to the PVC film, thereby facilitating its formation into a sheet or film and facilitating removal of the film or sheet from the apparatus used to form that product. The presence of the oxidized polyethylene permits the formulator to reduce the amount of other lubricating additives used, or to eliminate them altogether. For instance, $C_{12}$–$C_{22}$ carboxylic stearic acids such as stearic acid can be reduced or eliminated.

PVC formulations compounded with PVC, a stabilizer composition according to the present invention, oxidized polyethylene, and other additives such as conventional fillers, processing aids, plasticizer, antioxidant, colorants, and the like, can be formed into film or sheeting useful in, for instance, the manufacture of wall coverings, by feeding the formulation between the heated rollers of a two-roll mill and forming and recovering the product in conventional manner. Thereafter, the film or sheet can be printed using customary techniques.

The following examples will illustrate formulation and use of stabilizer compositions according to the present invention.

EXAMPLE 1

In a heated, stirred reactor, 135.2 pounds of oleic acid and 199.2 pounds of meta-toluic acid were stirred together and heated to about 212° F. To this mixture were added 139.6 pounds of barium hydroxide and 19.5 pounds of zinc oxide which were stirred into the mixture and allowed to react at a temperature of about 275° F. for about 1–2 hours. The resulting product was a 2:1 (wt.) mixture of barium meta-toluate and zinc oleate.

To this material was added 467.6 pounds of a blend of phenyl-isodecyl phosphites composed of about 20 wt. % triphenyl phosphite, 59 wt. % diphenyl isodecyl phosphite, 19 wt. % phenyl-di-isodecyl phosphite and 1.5 wt. % tri-isodecyl phosphite, and about 82.8 pounds of an organic acid phosphite which had been previously formed by hydrolyzing the aforementioned triorganic phosphite and stripping off one mole of phenol per mole of triorganic phosphite. This mixture was then stirred, at a temperature of about 220° F.

To this mixture were added 92.3 pounds of overbased barium oleate, 92.3 pounds of zinc-2-ethyl hexanoate toluate (as an 8.5 wt. % solution in isodecyl alcohol and mineral spirits), 261.0 pounds of a phenyl-(2-ethylhexyl) phosphite product comprising a mixture of about 20 wt. % triphenyl phosphite, about 59 wt. % of diphenyl (2-ethylhexyl phosphite), about 19 wt. % of phenyl-di(2-ethylhexyl) phosphite and about 1.5 wt. % of tri(2-ethylhexyl) phosphite, and about 15.4 pounds of an antioxidant for PVC resin.

About 77 pounds of diketone (dibenzoyl methane) was also added to this mixture.

EXAMPLE 2

Stabilizer compositions such as those prepared in accordance with Example 1 have been incorporated into PVC films and sheeting in accordance with conventional formulation and processing techniques. For instance, the following components were mixed together in the amounts indicated:

| Component | Amount, parts by weight |
|---|---|
| medium weight PVC | 96 |
| plasticizers | 32 |
| other processing aids, flame retardants, and antimicrobial agent | 5.5 |
| inorganic fillers and opacifiers and colorants | 55 |

To a thorough mixture of these components was added about 3.5 phr of the composition prepared in accordance with Example 1, and 0.75 phr of oxidized polyethylene ("A-C Polyethylene 629A", Allied-Signal Corp.). All these components were intimately stirred together and fed to a heated 2-roll mill of conventional design whereon the mixture was formed into a thin, continuous, white sheet of PVC. The sheet was recovered off the mill. Application of a quantity of water-based ink using a conventional ink roller deposited a layer of color onto the PVC sheet which layer appeared uniform and continuous to the naked eye and which, upon drying, retained its uniform, continuous appearance free of the appearance of discrete micro drops and the like.

It has been found that PVC films and sheets compounded with the stabilizers of the present invention exhibit notable heat stability, and also can be satisfactorily printed with water-based ink systems thereby forming attractive, continuous, adherent layers of ink which do not exhibit individual drop-like appearance, and which remain stable and adherent on the surface of the PVC even for prolonged periods of time. This observation has been confirmed for freshly compounded PVC film and sheeting, as well as for PVC film and sheeting which has been stored for several months between the compounding and the printing thereof.

What is claimed is:

1. A liquid stabilizer composition which imparts heat stability and printability to PVC and which is essentially free of cadmium comprising:

(A) a barium-zinc carboxylate salt mixture formed by in-situ reaction of (i) one or more zinc compounds and (ii) one or more barium compounds, both of which are capable of reacting with aliphatic and aromatic carboxylic acids to form salts thereof, with (iii) one or more $C_6$ to $C_{20}$, saturated or unsaturated, straight or branched aliphatic carboxylates or carboxylic acids and (iv) one or more $C_8$ to $C_{10}$ aromatic carboxylates or carboxylic acids under conditions of agitation and heat sufficient to form the barium and zinc carboxylate salts, the weight ratio of the barium to the zinc being in the range of 2:1 to 6:1 and the weight ratio of the aliphatic carboxylate to the aromatic carboxylate being in the range of 3:1 to 1:3;

(B) one or more organic triphosphites of the formula $R_1OP(OR_3)OR_2$ wherein $R_1$, $R_2$ and $R_3$ are the same or different and each is alkyl containing 6 to 12 carbon atoms, or phenyl; and (C) one or more organic acid phosphites of the formula $R_4OP(OH)OR_5$ wherein $R_4$ is alkyl containing 6 to 12 carbon atoms, or phenyl, and $R_5$ is alkyl containing 6 to 12 carbon atoms, phenyl or hydrogen, wherein the amount of said component (A) comprises about 30 wt. % to about 50 wt. % of the total amount of components (A), (B) and (C) present in said composition, the amount of said component (B) comprises about 40% to about 60 wt. % of the total amount of components (A), (B), and (C) present in said composition, and the amount of said component (C) comprises about 4 wt. % to about 10 wt. % of the total amount of components (A), (B) and (C) present in said composition.

2. A stabilizer composition in accordance with claim 1 wherein the aliphatic carboxylates are 2-ethyl hexanoate and oleate.

3. A stabilizer composition in accordance with claim 1 wherein said salt mixture comprises 2-ethyl hexanoate.

4. A stabilizer in accordance with claim 1 wherein said aliphatic carboxylate comprises oleate.

5. A stabilizer composition in accordance with claim 1 wherein said aromatic carboxylate is meta-toluate.

6. A stabilizer composition in accordance with claim 1 wherein each of $R_1$, $R_2$ and $R_3$ is decyl or phenyl.

7. A stabilizer composition in accordance with claim 1 wherein said one or more organic triphosphites is a mixture of triphenyl phosphite, diphenyl-isodecyl phosphite, monophenyl di-isodecyl phosphite, and tri-isodecyl phosphite.

8. A stabilizer composition in accordance with claim 1 wherein said one or more organic triphosphites is a mixture of triphenyl phosphite, diphenyl-2-ethylhexyl phosphite, monophenyl di-2-ethylhexyl phosphite, and tri-2-ethylhexyl phosphite.

9. A stabilizer composition in accordance with claim 1 wherein said one or more barium compounds and said one or more zinc compounds comprise barium hydroxide and zinc oxide.

10. A stabilizer composition in accordance with claim 1, further comprising about 1 wt. % to about 8 wt. % of a diketone of the formula $D_1C(O)-(CH_2)_{1-2}-C(O)D_2$ wherein each of $D_1$ and $D_2$ is phenyl, $C_{12}$–$C_{22}$ alkyl, or $C_{12}$–$C_{22}$ alkylene.

11. A stabilizer composition in accordance with claim 10 wherein said diketome is dibenzoyl methane.

12. A polyvinyl chloride resin composition having improved resistance to heat-mediated deterioration, wherein film formed from said resin composition exhibits improved wettability to water-based inks applied thereto, the composition comprising (i) a polyvinyl chloride resin formed at least in part of the recurring group —CHCl—CX$_2$— and having a chlorine content in excess of 40%, wherein each X is either hydrogen or chlorine, (ii) a stabilizer composition in accordance with claim 1 in a small but effective amount to enhance the resistance to heat-mediated deterioration of said resin and (iii) oxidized polyethylene in a small but effective amount to improve the wettability to water-based inks of film formed from said resin composition.

13. A polyvinyl chloride resin composition in accordance with claim 12 in which the polyvinyl chloride resin is polyvinyl chloride homopolymer.

14. A polyvinyl chloride resin composition in accordance with claim 12, further comprising about 1 wt. % to about 8 wt. % of a diketone of the formula $D_1C(O)$—$(CH_2)_{1-2}$—$C(O)D_2$ wherein each of $D_1$ and $D_2$ is phenyl, $C_{12}$–$C_{22}$ alkyl, or $C_{12}$–$C_{12}$ alkylene.

15. A polyvinyl chloride resin composition in accordance with claim 14 wherein said diketone is dibenzoyl methane.

16. A cadmium-free printability stabilizer system for PVC which comprises: (a) a salt mixture component prepared by in situ reaction of barium hydroxide, zinc oxide, oleic acid and toulic acid wherein the weight of barium to zinc is about 2:1 to about 6:1; (b) an organic triphosphite component comprising triphenyl phosphite, diphenyl isodecyl phosphite, phenyl diisodecyl phosphite and triisodecyl phosphite; (c) an organic acid phosphite component comprising diphenyl acid phosphite, phenyl isodecyl acid phosphite and diisodecyl acid phosphite; and (d) an oxidized polyethylene component; said component (a) comprising about 30 to about 50 weight % of the total of (a), (b) and (c); said component (b) comprising about 40 to about 60 weight % of the total of (a), (b) and (c); said component (c) comprising about 4 to about 10 weight % of the total of (a), (b) and (c); and wherein the weight of said oxidized polyethylene component (d) to the total of (a), (b) and (c) is about 1:2 to about 1:6.

* * * * *

UNITED STATES PATENT AND TRADEMARK OFFICE
CERTIFICATE OF CORRECTION

PATENT NO. : 5,880,189
DATED : March 9, 1999
INVENTOR(S) : M.A. Croce, et al.

It is certified that error appears in the above-identified patent and that said Letters Patent are hereby corrected as shown below:

On The Title Page, [56] References Cited, OTHER PUBLICATIONS: "Jun." should read --Jan.--

Column 2, Line 28: "containing." should read --containing--

Column 4, Line 28: "phosphates" should read --phosphites--

Column 9, Line 4, Claim 11: "diketome" should read --diketone--

Column 10, Line 2, Claim 14: "$C_{12}-C_{12}$" should read --$C_{12}-C_{22}$--

Signed and Sealed this

Eighth Day of May, 2001

Attest:

NICHOLAS P. GODICI

*Attesting Officer*   *Acting Director of the United States Patent and Trademark Office*